United States Patent
Ganireddy et al.

(10) Patent No.: US 10,491,038 B2
(45) Date of Patent: Nov. 26, 2019

(54) ELECTRICAL POWER SUBSYSTEMS AND METHODS FOR CONTROLLING SAME

(71) Applicant: General Electric Company, Schenectady, NY (US)

(72) Inventors: Govardhan Ganireddy, Roanoke, VA (US); Saurabh Shukla, Clifton Park, NY (US); Anthony Michael Klodowski, Hardy, VA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 28 days.

(21) Appl. No.: 15/623,422

(22) Filed: Jun. 15, 2017

(65) Prior Publication Data
US 2018/0366977 A1   Dec. 20, 2018

(51) Int. Cl.
| | | |
|---|---|---|
| *H02P 9/00* | (2006.01) | |
| *H02J 11/00* | (2006.01) | |
| *H02K 7/18* | (2006.01) | |
| *F03D 9/25* | (2016.01) | |

(52) U.S. Cl.
CPC .............. *H02J 11/00* (2013.01); *H02K 7/183* (2013.01); *H02P 9/007* (2013.01); *F03D 9/255* (2017.02)

(58) Field of Classification Search
CPC .......... H02J 11/00; F03D 9/255; H02P 9/007; H02K 7/183
USPC ......... 290/44, 55; 700/287, 288; 307/11, 43, 307/68, 112; 322/61, 59, 89
See application file for complete search history.

(56) References Cited

U.S. PATENT DOCUMENTS

| | | | | |
|---|---|---|---|---|
| 7,239,036 B2* | 7/2007 | D'Atre | ................. | F03D 7/0272 290/44 |
| 7,531,910 B2* | 5/2009 | Flottemesch | .......... | H02P 9/007 290/44 |
| 8,659,178 B2 | 2/2014 | Arlaban Gabeiras et al. | | |
| 8,669,669 B1* | 3/2014 | Wagoner | ................. | H02P 9/007 290/44 |
| 8,854,015 B2* | 10/2014 | Deng | ........................ | H02P 9/00 290/44 |
| 9,587,626 B2 | 3/2017 | Sadaba et al. | | |
| 2005/0071050 A1* | 3/2005 | Chow | ........................ | G05F 1/70 700/286 |
| 2011/0106470 A1* | 5/2011 | Yin | ............................ | H02J 3/01 702/58 |

(Continued)

OTHER PUBLICATIONS

Baron et al., Breaking the 34.5kV Standard, Drawing on hydro experience, Acciona extols use of 12kV collection system to lower energy costs through elimination of Step-up transformers, Wind Systems Magazine, Apr. 2013, pp. 48-54.

(Continued)

*Primary Examiner* — Julio C. Gonzalez
(74) *Attorney, Agent, or Firm* — Dority & Manning, P.A.

(57) ABSTRACT

A method for controlling an electrical power subsystem includes determining an auxiliary voltage error value based on a measured voltage of the low voltage distribution panel. The method further includes receiving an active current command. The method further includes calculating a switching pattern for a line-side converter of the power converter based on the auxiliary voltage error value and the active current command. A current level produced by the line-side converter controls a voltage to the low voltage distribution panel.

20 Claims, 10 Drawing Sheets

(56) References Cited

U.S. PATENT DOCUMENTS

| | | | | |
|---|---|---|---|---|
| 2011/0156389 A1* | 6/2011 | Arlaban Gabeiras | ........................ | H02J 3/1885 290/44 |
| 2012/0217824 A1* | 8/2012 | Gupta | ................... | F03D 7/0272 307/145 |
| 2012/0277919 A1* | 11/2012 | Ko | ........................... | H02J 3/16 700/286 |
| 2013/0079945 A1* | 3/2013 | Achilles | ................ | H02J 3/1892 700/298 |
| 2013/0229056 A1* | 9/2013 | Teichmann | ............. | H02J 3/382 307/18 |

OTHER PUBLICATIONS

Olonso Sadaba et al., Wind Generation Control Strategies for Grid Integration Acciona Windpower Experience, ResearchGate, Acciona Windpower, S.A., uploaded 2015, 11 Pages. https://researchgate.net/publication/267966410.

\* cited by examiner

ELECTRICAL POWER SUBSYSTEMS AND METHODS FOR CONTROLLING SAME

FIELD OF THE INVENTION

The present disclosure relates generally to electrical power systems for providing power to a power grid from, for example, wind turbines.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

Figure 1:
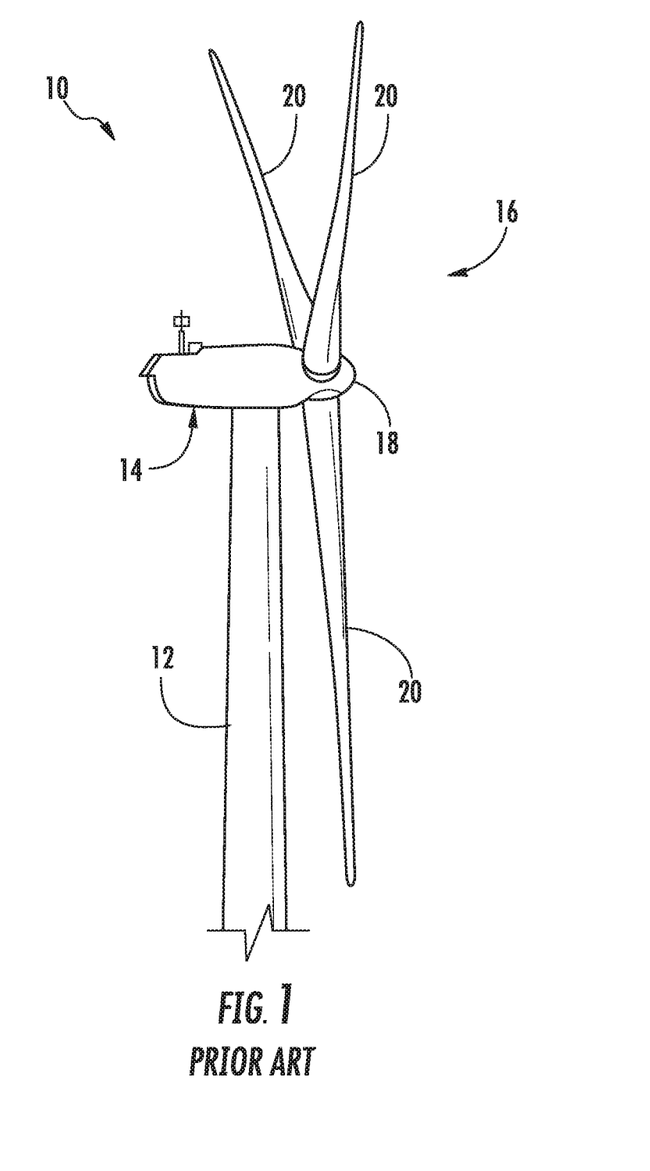
FIG. 1 illustrates a perspective view of a portion of one embodiment of a wind turbine according to conventional construction.
Figure 2:
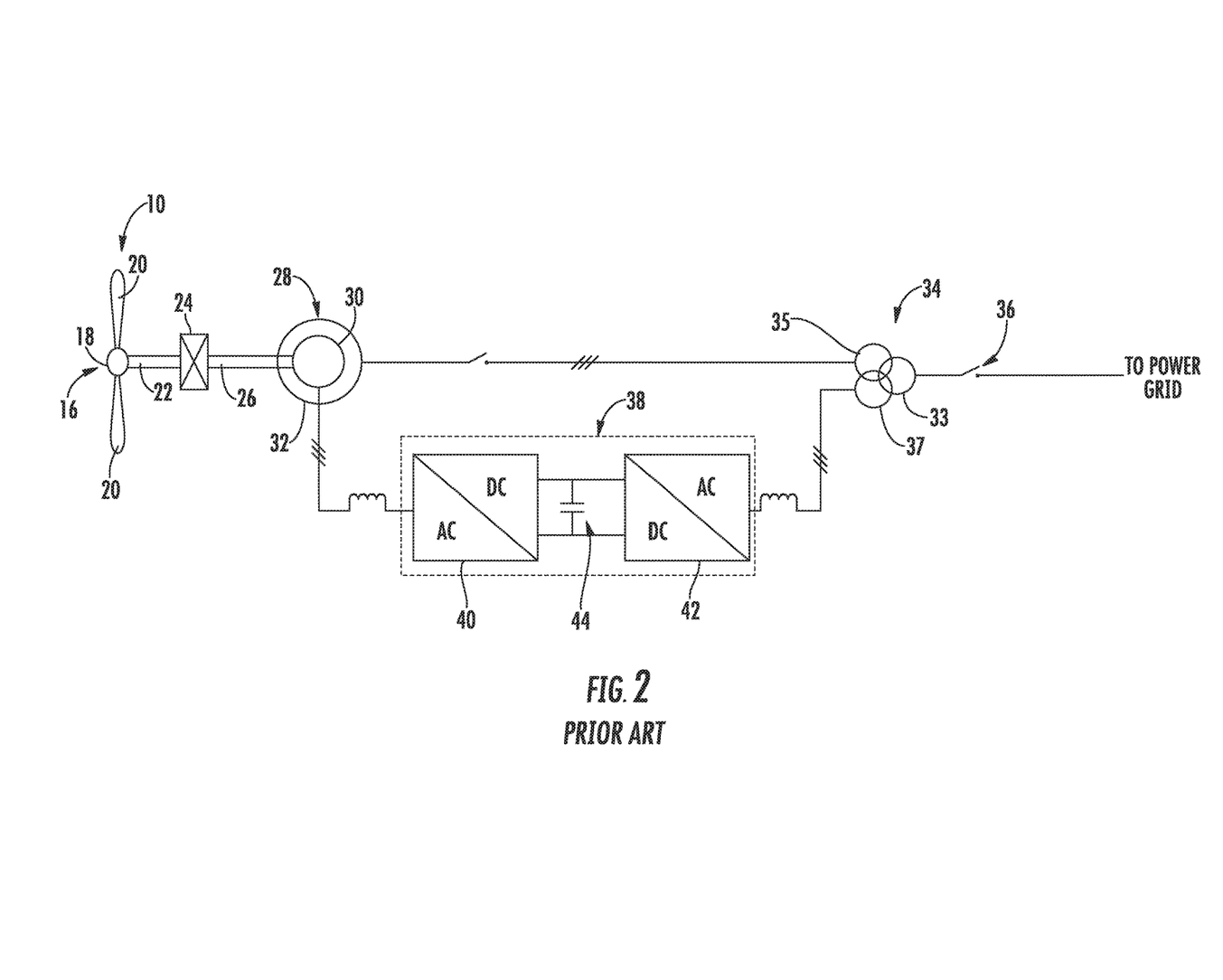
FIG. 2 illustrates a schematic diagram of a conventional electrical power system suitable for use with the wind turbine shown in FIG. 1.

For example, FIGS. 1 and 2 illustrate a wind turbine 10 and associated power system suitable for use with the wind turbine 10 according to conventional construction. As shown, the wind turbine 10 includes a nacelle 14 that typically houses a generator 28 (FIG. 2). The nacelle 14 is mounted on a tower 12 extending from a support surface (not shown). The wind turbine 10 also includes a rotor 16 that includes a plurality of rotor blades 20 attached to a rotating hub 18. As wind impacts the rotor blades 20, the blades 20 transform wind energy into a mechanical rotational torque that rotatably drives a low-speed shaft 22. The low-speed shaft 22 is configured to drive a gearbox 24 (where present) that subsequently steps up the low rotational speed of the low-speed shaft 22 to drive a high-speed shaft 26 at an increased rotational speed. The high-speed shaft 26 is generally rotatably coupled to a generator 28 (such as a doubly-fed induction generator or DFIG) so as to rotatably drive a generator rotor 30. As such, a rotating magnetic field may be induced by the generator rotor 30 and a voltage may be induced within a generator stator 32 that is magnetically coupled to the generator rotor 30. The associated electrical power can be transmitted from the generator stator 32 to a main three-winding transformer 34 that is typically connected to a power grid via a grid breaker 36. Thus, the main transformer 34 steps up the voltage amplitude of the electrical power such that the transformed electrical power may be further transmitted to the power grid.

In addition, as shown, the generator 28 is typically electrically coupled to a bi-directional power converter 38 that includes a rotor-side converter 40 joined to a line-side converter 42 via a regulated DC link 44. The rotor-side converter 40 converts the AC power provided from the rotor 30 into DC power and provides the DC power to the DC link 44. The line side converter 42 converts the DC power on the DC link 44 into AC output power suitable for the power grid. Thus, the AC power from the power converter 38 can be combined with the power from the stator 32 to provide multi-phase power (e.g. three-phase power) having a frequency maintained substantially at the frequency of the power grid (e.g. 50 Hz/60 Hz).

As shown in FIG. 2, the illustrated three-winding transformer 34 typically has (1) a 33 kilovolt (kV) medium voltage (MV) primary winding 33 connected to the power grid, (2) a 6 to 13.8 kV MV secondary winding 35 connected to the generator stator 32, and (3) a 690 to 900 volt (V) low-voltage (LV) tertiary winding 37 connected to the line-side power converter 42.

Figure 3:
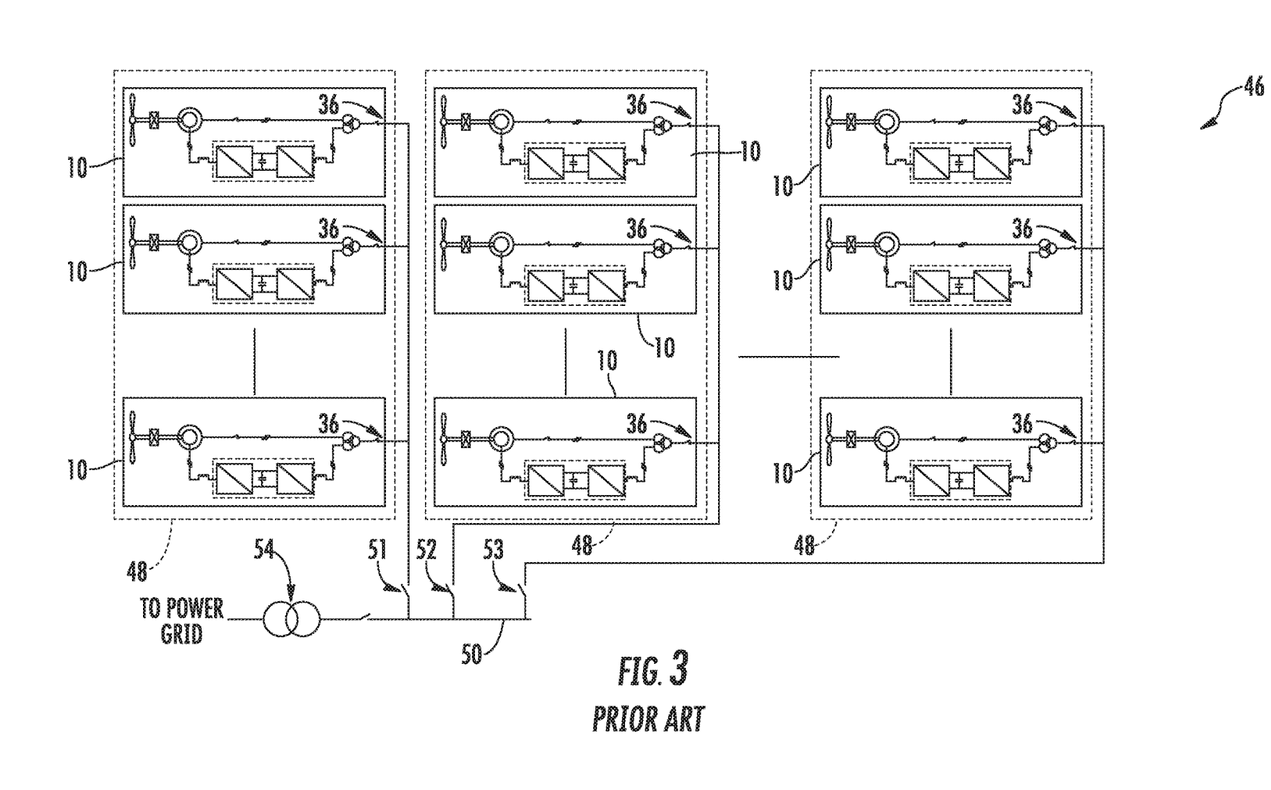
FIG. 3 illustrates a schematic diagram of one embodiment of a conventional wind farm according to conventional construction, particularly illustrating a plurality of wind turbine power systems such as those illustrated in FIG. 2 connected to a single sub-station transformer.

Referring now to FIG. 3, individual power systems of a plurality of wind turbines 10 may be arranged in a predetermined geological location and electrically connected together to form a wind farm 46. More specifically, as shown, the wind turbines 10 may be arranged into a plurality of groups 48 with each group separately connected to a main line 50 via switches 51, 52, 53, respectively. In addition, as shown, the main line 50 may be electrically coupled to another, larger transformer 54 for further stepping up the voltage amplitude of the electrical power from the groups 48 of wind turbines 10 before sending the power to the grid.

One issue with such systems, however, is that the three-winding transformers 34 associated with each turbine 10 are expensive. Particularly, the secondary winding 35 of the transformer 34 that is connected to the generator stator 32 can be costly. Thus, it would be advantageous to eliminate such three-winding transformers from wind turbine power systems.

However, the three-winding transformer 34 of each wind turbine 10 provides a certain impedance that allows the wind turbines 10 in the wind farm 46 to regulate the voltage at the secondary winding of the three-winding transformer. If the three-winding transformer 34 is removed, this impedance, as well as associated voltage control at the stator 32, is lost. Reactive power flow is thus not pushed to the grid. Further, voltage control for auxiliary loads being fed by each system may be lost, thus requiring auxiliary components with higher voltage ratings to compensate for potential increased voltages. Use of such components is undesirable due to higher associated costs and additional qualification requirements.

Accordingly, improved electrical power systems and methods for operating such systems are desired. In particular, electrical power systems having the above-discussed three-winding transformer 34 removed, and which are additionally capable of reactive power generation and auxiliary load voltage control, would be advantageous.

BRIEF DESCRIPTION OF THE INVENTION

Aspects and advantages of the invention will be set forth in part in the following description, or may be obvious from the description, or may be learned through practice of the invention.

In accordance with one embodiment, a method for controlling an electrical power subsystem is provided. The electrical power subsystem includes a power converter electrically coupled to a generator having a generator rotor and a generator stator. The electrical power subsystem defines a stator power path and a converter power path for providing power to the power grid, the converter power path including a partial power transformer. The electrical power subsystem further includes a low voltage distribution panel electrically coupled to the converter power path. The method includes determining an auxiliary voltage error value based on a measured voltage of the low voltage distribution panel. The method further includes receiving an active current command. The method further includes calculating a switching pattern for a line-side converter of the power converter based on the auxiliary voltage error value and the active current command. A current level produced by the line-side converter controls a voltage to the low voltage distribution panel.

In accordance with another embodiment, an electrical power subsystem for connection to a power grid is provided. The electrical power subsystem includes a generator including a generator stator and a generator rotor. The electrical power subsystem further includes a power converter electrically coupled to the generator, the power converter including a rotor-side converter, a line-side converter, and a regulated DC link electrically coupling the rotor-side converter and the line-side converter. The electrical power subsystem further includes a stator power path for providing power from the generator stator to the power grid, a converter power path for providing power from the generator rotor through the power converter to the power grid, a partial power transformer provided on the converter power path, and a low voltage distribution panel electrically coupled to the converter power path. The electrical power subsystem further includes a controller communicative coupled to the power converter, the controller configured to perform one or more operations. The one or more operations include determining an auxiliary voltage error value based on a measured voltage of the low voltage distribution panel. The one or more operations further includes receiving an active current command. The one or more operations further includes calculating a switching pattern for a line-side converter of the power converter based on the auxiliary voltage error value and the active current command. A current level produced by the line-side converter controls a voltage to the low voltage distribution panel.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 4:
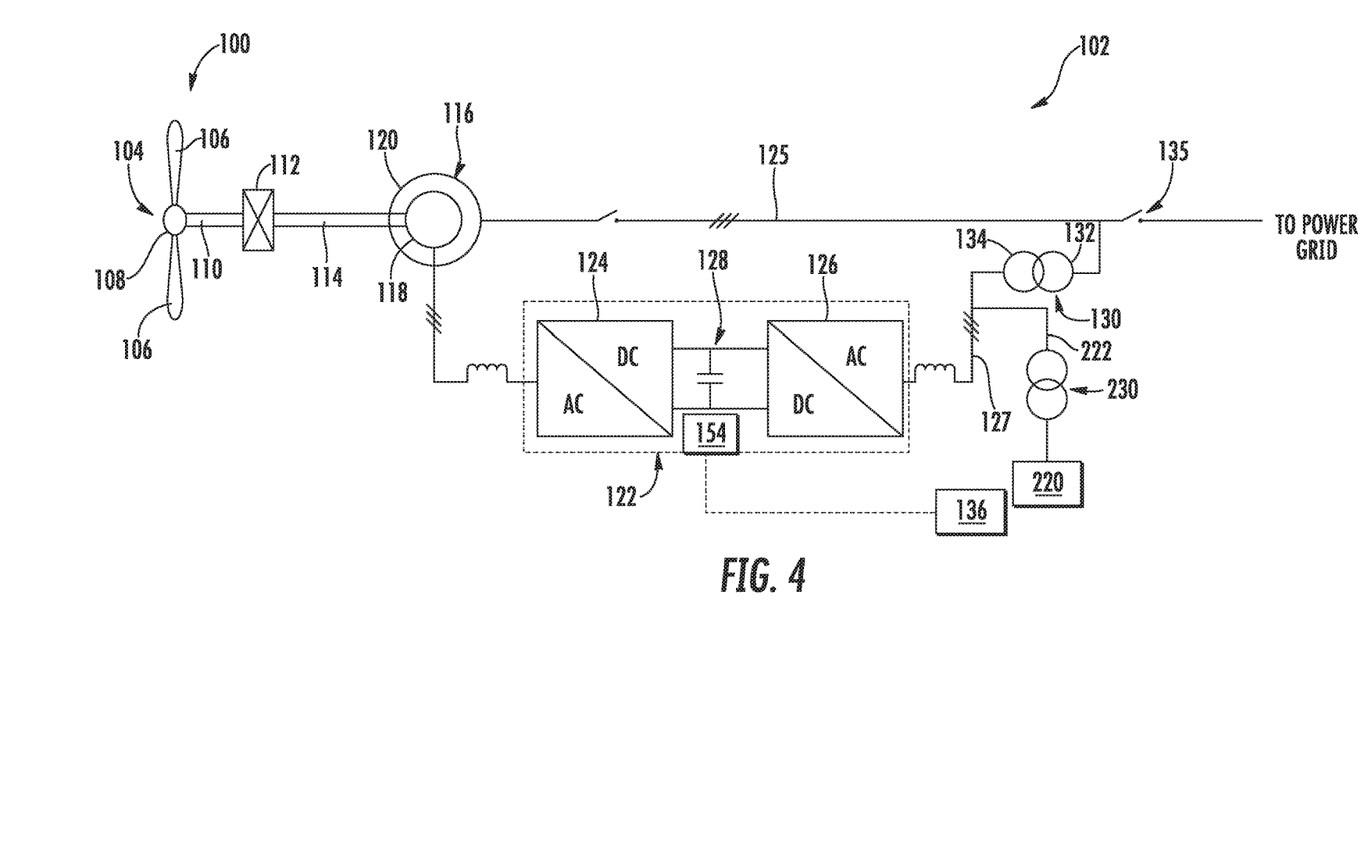
FIG. 4 illustrates a schematic diagram of one embodiment of an electrical power system for a wind turbine according to the present disclosure.
Figure 5:
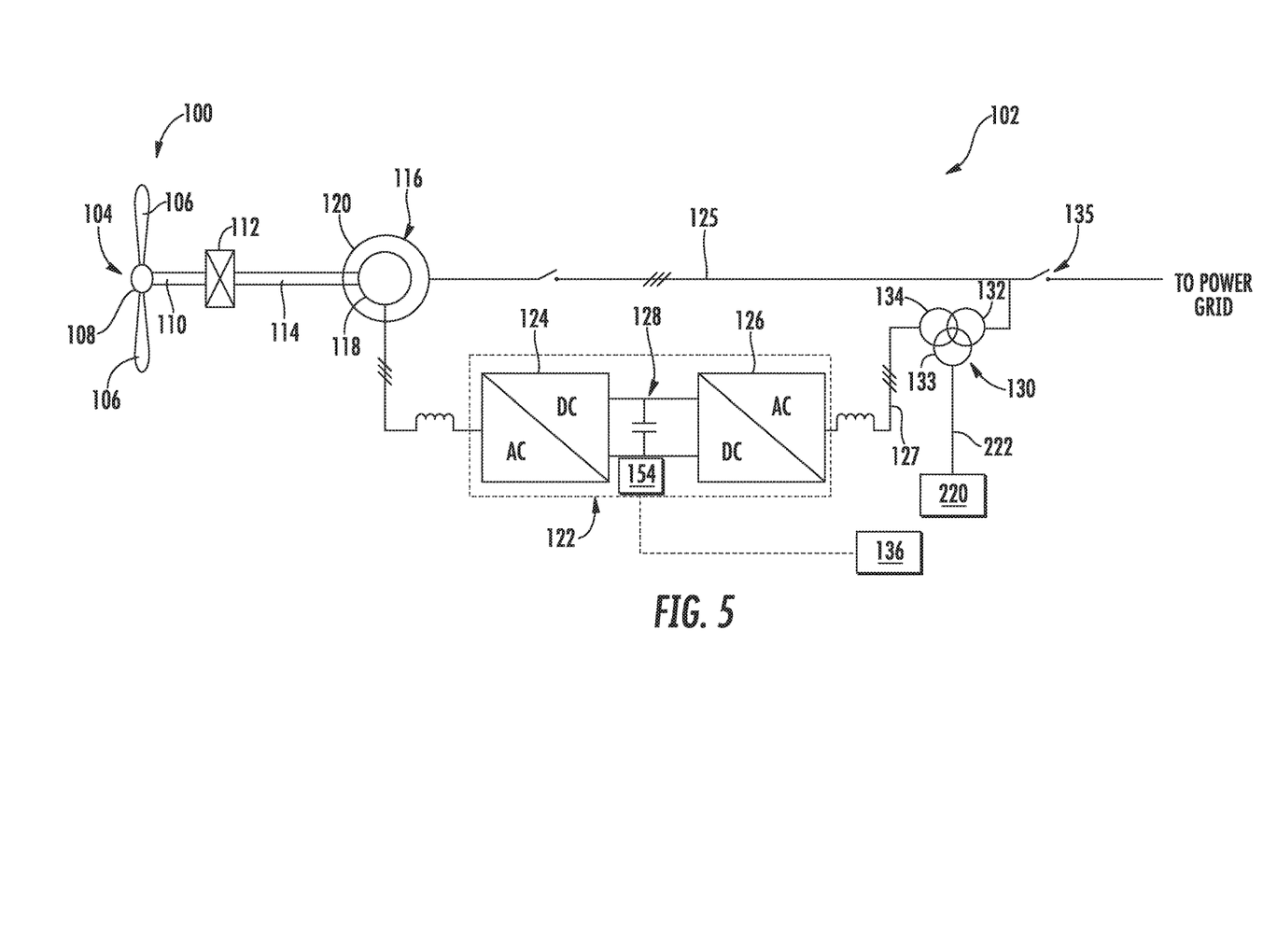
FIG. 5 illustrates a schematic diagram of another embodiment of an electrical power system for a wind turbine according to the present disclosure.

Referring now to FIGS. 4 and 5, a schematic diagram of one embodiment of an electrical power subsystem 102 according to the present disclosure is illustrated. It should be understood that the term "subsystem" is used herein to distinguish between the individual power systems (e.g. as shown in FIGS. 4 and 5 or FIG. 2) and the overall electrical power system 105 of FIG. 6 or FIG. 3 that includes a plurality of electrical power subsystems 102. Those of ordinary skill in the art, however, will recognize that the electrical power subsystem 102 of FIGS. 4 and 5 (or FIG. 2) may also be referred to more generically, such as a simply a system (rather than a subsystem). Therefore, such terms may be used interchangeably and are not meant to be limiting.

Further, as shown, the electrical power subsystem 102 may correspond to a wind turbine power system 100. More specifically, as shown, the wind turbine power system 100 includes a rotor 104 that includes a plurality of rotor blades 106 attached to a rotating hub 108. As wind impacts the rotor blades 106, the blades 106 transform wind energy into a mechanical rotational torque that rotatably drives a low-speed shaft 110. The low-speed shaft 110 is configured to drive a gearbox 112 that subsequently steps up the low rotational speed of the low-speed shaft 110 to drive a high-speed shaft 114 at an increased rotational speed. The high-speed shaft 114 is generally rotatably coupled to a doubly-fed induction generator 116 (referred to hereinafter as DFIG 116) so as to rotatably drive a generator rotor 118. As such, a rotating magnetic field may be induced by the generator rotor 118 and a voltage may be induced within a generator stator 120 that is magnetically coupled to the generator rotor 118. In one embodiment, for example, the generator 116 is configured to convert the rotational mechanical energy to a sinusoidal, three-phase alternating current (AC) electrical energy signal in the generator stator 120. Thus, as shown, the associated electrical power can be transmitted from the generator stator 120 directly the grid.

In addition, as shown, the generator 116 is electrically coupled to a bi-directional power converter 122 that includes a rotor-side converter 124 joined to a line-side converter 126 via a regulated DC link 128. Thus, the rotor-side converter 124 converts the AC power provided from the generator rotor 118 into DC power and provides the DC power to the DC link 128. The line side converter 126 converts the DC power on the DC link 128 into AC output power suitable for the power grid. More specifically, as shown, the AC power from the power converter 122 can be combined with the power from the generator stator 120 via a converter power path 127 and a stator power path 125, respectively. For example, as shown, and in contrast to conventional systems such as those illustrated in FIGS. 1-3, the converter power path 127 may include a partial power transformer 130 for stepping up the voltage amplitude of the electrical power from the power converter 122 such that the transformed electrical power may be further transmitted to the power grid. Thus, as shown, the illustrated system 102 of FIGS. 4 and 5 does not include the conventional three-winding main transformer described above. Rather, as shown in the illustrated embodiment of FIG. 4, the partial power transformer 130 may correspond to a two-winding transformer having a primary winding 132 connected to the power grid and a secondary winding 134 connected to the line side converter 126. Notably, in some embodiments as shown in the illustrated embodiment of FIG. 5, the partial power transformer may in some embodiments include a third auxiliary winding for auxiliary loads, as discussed herein.

In addition, the electrical power subsystem 102 may include a controller 136 configured to control any of the components of the wind turbine 100 and/or implement the method steps as described herein. For example, as shown particularly in FIG. 7, the controller 136 may include one or more processor(s) 138 and associated memory device(s) 140 configured to perform a variety of computer-implemented functions (e.g., performing the methods, steps, calculations and the like and storing relevant data as disclosed herein). Additionally, the controller 136 may also include a communications module 142 to facilitate communications between the controller 136 and the various components of the wind turbine 100, e.g. any of the components of FIGS. 4 through 6. Further, the communications module 142 may include a sensor interface 144 (e.g., one or more analog-to-digital converters) to permit signals transmitted from one or more sensors 139, 141, 143 to be converted into signals that can be understood and processed by the processors 138. It should be appreciated that the sensors 139, 141, 143 may be communicatively coupled to the communications module 142 using any suitable means. For example, as shown in FIG. 7, the sensors 139, 141, 143 may be coupled to the sensor interface 144 via a wired connection. However, in other embodiments, the sensors 139, 141, 143 may be coupled to the sensor interface 144 via a wireless connection, such as by using any suitable wireless communications protocol known in the art. As such, the processor 138 may be configured to receive one or more signals from the sensors 139, 141, 143.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 138 is also configured to compute advanced control algorithms and communicate to a variety of Ethernet or serial-based protocols (Modbus, OPC, CAN, etc.). Additionally, the memory device(s) 140 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 140 may generally be configured to store suitable computer-readable instructions that, when implemented by the processor(s) 138, configure the controller 136 to perform the various functions as described herein.

In operation, alternating current (AC) power generated at the generator stator 120 by rotation of the rotor 104 is provided via a dual path to the grid, i.e. via the stator power path 125 and the converter power path 127. More specifically, the rotor side converter 124 converts the AC power provided from the generator rotor 118 into DC power and provides the DC power to the DC link 128. Switching elements (e.g. IGBTs) used in bridge circuits of the rotor side converter 124 can be modulated to convert the AC power provided from the generator rotor 118 into DC power suitable for the DC link 128. The line side converter 126 converts the DC power on the DC link 128 into AC output power suitable for the grid. In particular, switching elements (e.g. IGBTs) used in bridge circuits of the line side converter 126 can be modulated to convert the DC power on the DC link 128 into AC power. As such, the AC power from the power converter 122 can be combined with the power from the generator stator 120 to provide multi-phase power having a frequency maintained substantially at the frequency of the grid. It should be understood that the rotor side converter 124 and the line side converter 126 may have any configuration using any switching devices that facilitate operation of electrical power system as described herein.

Further, the power converter 122 may be coupled in electronic data communication with the turbine controller 136 and/or a separate or integral converter controller 154 to control the operation of the rotor side converter 124 and the line side converter 126. For example, during operation, the controller 136 may be configured to receive one or more voltage and/or electric current measurement signals from the first set of voltage and electric current sensors 139, 141, 143. Thus, the controller 136 may be configured to monitor and control at least some of the operational variables associated with the wind turbine 100 via the sensors 139, 141, 143. In the illustrated embodiment, the sensors 139, 141, 143 may be electrically coupled to any portion of electrical power subsystem 102 that facilitates operation of electrical power subsystem 102 as described herein.

It should also be understood that any number or type of voltage and/or electric current sensors may be employed within the wind turbine 100 and at any location. For example, the sensors may be current transformers, shunt sensors, rogowski coils, Hall Effect current sensors, Micro Inertial Measurement Units (MIMUs), or similar, and/or any other suitable voltage or electric current sensors now known or later developed in the art. Thus, the converter controller 154 is configured to receive one or more voltage and/or electric current feedback signals from the sensors 139, 141, 143. More specifically, in certain embodiments, the current or voltage feedback signals may include at least one of line feedback signals, line-side converter feedback signals, rotor-side converter feedback signals, or stator feedback signals.

Figure 6:
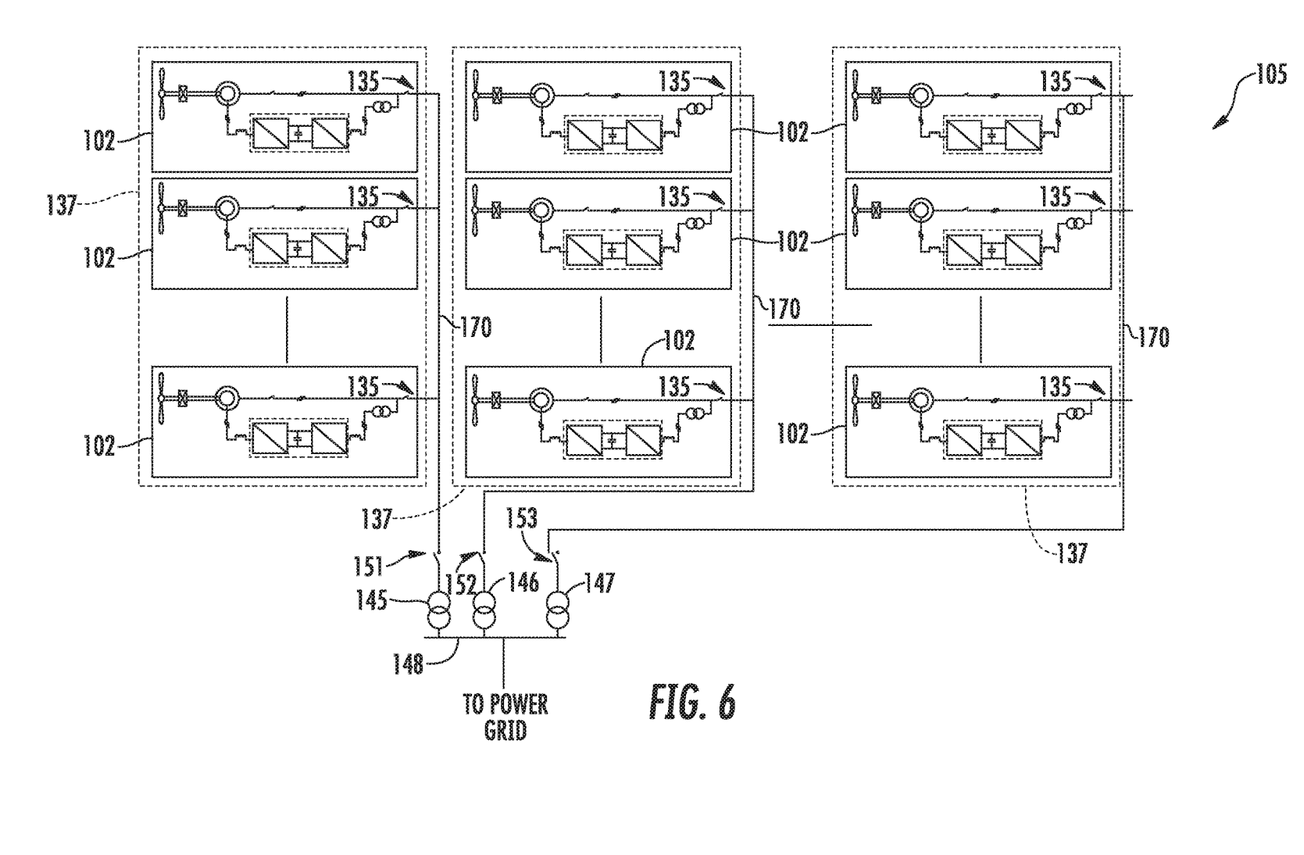
FIG. 6 illustrates a schematic diagram of one embodiment of a wind farm according to the present disclosure, particularly illustrating a plurality of wind turbine clusters each connected to the grid via a cluster transformer.
Figure 7:
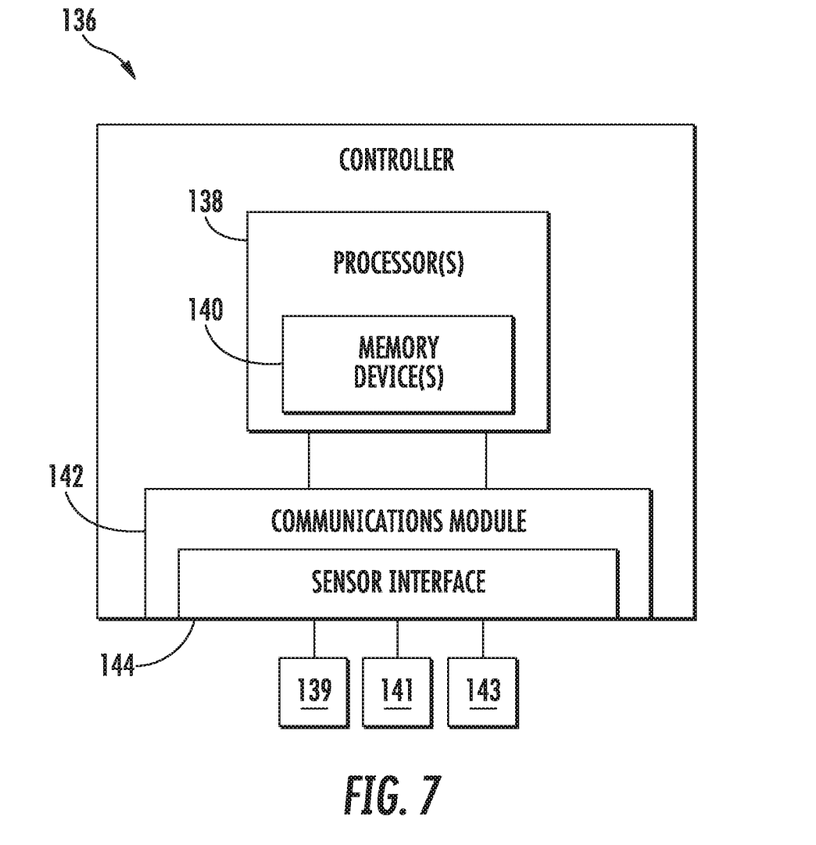
FIG. 7 illustrates a block diagram of one embodiment of a wind turbine controller according to the present disclosure.

Referring particularly to FIG. 6, individual power systems (such as the power subsystem 102 illustrated in FIGS. 4 and 5) may be arranged in at least two clusters 137 to form an electrical power system 105. More specifically, as shown, the wind turbine power systems 100 may be arranged into a plurality of clusters 137 so as to form a wind farm. Thus, as shown, each cluster 137 may be connected to a separate cluster transformer 145, 146, 147 via switches 151, 152, 153, respectively, for stepping up the voltage amplitude of the electrical power from each cluster 137 such that the transformed electrical power may be further transmitted to the power grid. In addition, as shown, the transformers 145, 146, 147 are connected to a main line 148 (via a substation transformer as discussed herein) that combines the power from each cluster 137 before sending the power to the grid. In other words, as shown, the stator power circuit of all the wind turbines 100 share a common ground reference provided by the neutral of the secondary winding 124 of the cluster transformer 145, 146, 147 or by a separate neutral grounding transformer. Each subsystem 102 may be connected to the cluster 137 via a subsystem breaker 135, as shown.

Referring still to FIG. 6, and as discussed, the cluster 137 includes a cluster transformer 145, 146, 147 connecting each cluster 137 of electrical power subsystems 102 to the power grid. Thus, the cluster 137 includes a cluster switch 151, 152, 153 configured with the cluster transformer 145, 146, 147. A cluster power path 170 may electrically connect the cluster 137 to the cluster transformer 145, 146, 147, such as via cluster switches 151, 152, 153. The cluster power path 170 may, for example, extend from each subsystem 102, such as the converter power path 127 and stator power path 125 thereof, to the cluster transformer 145, 146, 147, such as to the winding of the cluster transformer to which the subsystem 102 is connected.

The cluster transformer 145, 146, 147 is, in exemplary embodiments, a two-winding transformer 145, 146, 147. Further, in exemplary embodiments, the cluster transformer 145, 146, 147 steps the voltage up from a low voltage level at the substation level to a medium voltage at the cluster level.

For example, the voltage on the stator power path 125 of each subsystem 102 may be a medium voltage, such as between 6 and 14 kV, or between 12 and 14 kV. The voltage on the converter power path 127 after the power converter 122 may be a low voltage, such as between 600 and 900 V. This voltage may be stepped up to the medium voltage level of 6 and 14 kV, or between 12 and 14 kV, by the partial power transformer 130. Partial power transformer 130 may thus include a primary winding 132 having a voltage between 6 and 14 kV, or between 12 and 14 kV, and a secondary winding 134 having a voltage between 600 and 900 V.

Each cluster transformer 145, 146, 147 may include a primary winding and a secondary winding. The secondary winding may be connected to the cluster power path 170, and the primary winding may be connected to a power path leading to the power grid.

Referring again to FIGS. 4 and 5, each subsystem 102 may include a low voltage distribution panel 220 which is electrically coupled to the converter power path 127, such as the line side thereof as shown. The low voltage distribution panel 220 may provide power to auxiliary loads, such as lighting and other relatively small loads within the wind turbine of the subsystem 102.

In some embodiments, as illustrated in FIG. 5, the partial power transformer 130 is a three-winding transformer which includes an auxiliary winding 133 in addition to primary winding 132 and secondary winding 134. Auxiliary winding 133 may be a low voltage (300-900 V) winding. Power may be provided through auxiliary winding 133 to the low voltage distribution panel 220. An auxiliary power path 222 thus extends between and electrically couples the panel 220 and auxiliary winding 133.

In other embodiments, as illustrated in FIG. 4, the partial power transformer 130 is a two-winding transformer which includes only the primary winding 132 and secondary winding 134. In these embodiments, power may be provided to the low voltage distribution panel 220 via an electrical coupling of the low voltage distribution panel 220 to the secondary winding 134 side of the converter power path 127, such as to the converter power path 127 between the transformer 130 and the power converter 122, via the auxiliary power path 222. In these embodiments an auxiliary power transformer 230 may be provided on the auxiliary power path 222, and may provide such electrical coupling. The auxiliary power transformer 230 may, in exemplary embodiments, be a two-winding transformer with low voltage (600-900 V) primary winding and medium voltage (6-14 or 12-14 mV) secondary winding.

Figure 8:
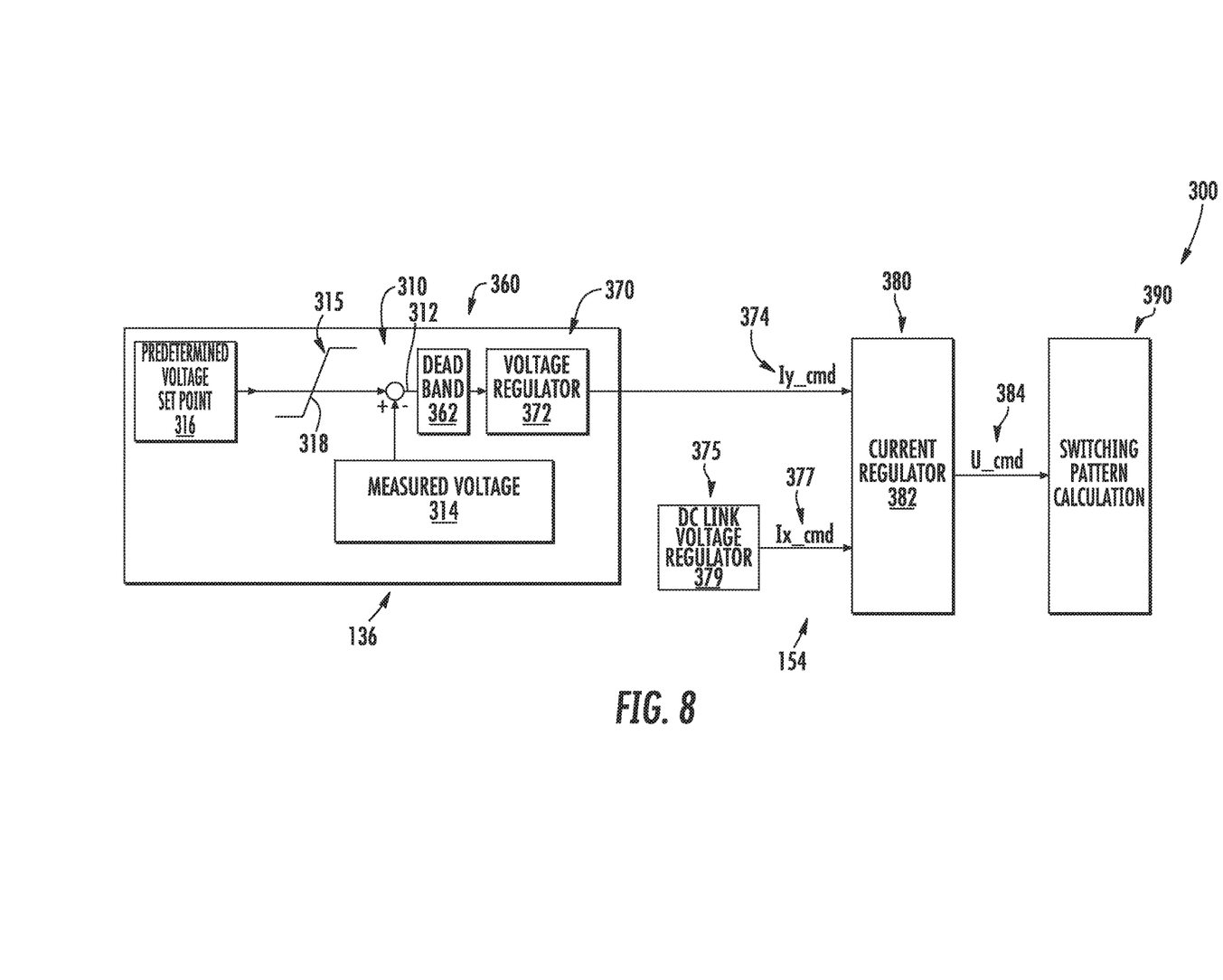
FIG. 8 illustrates a flow diagram of one embodiment of a method for operating an electrical power system according to the present disclosure.
Figure 9:
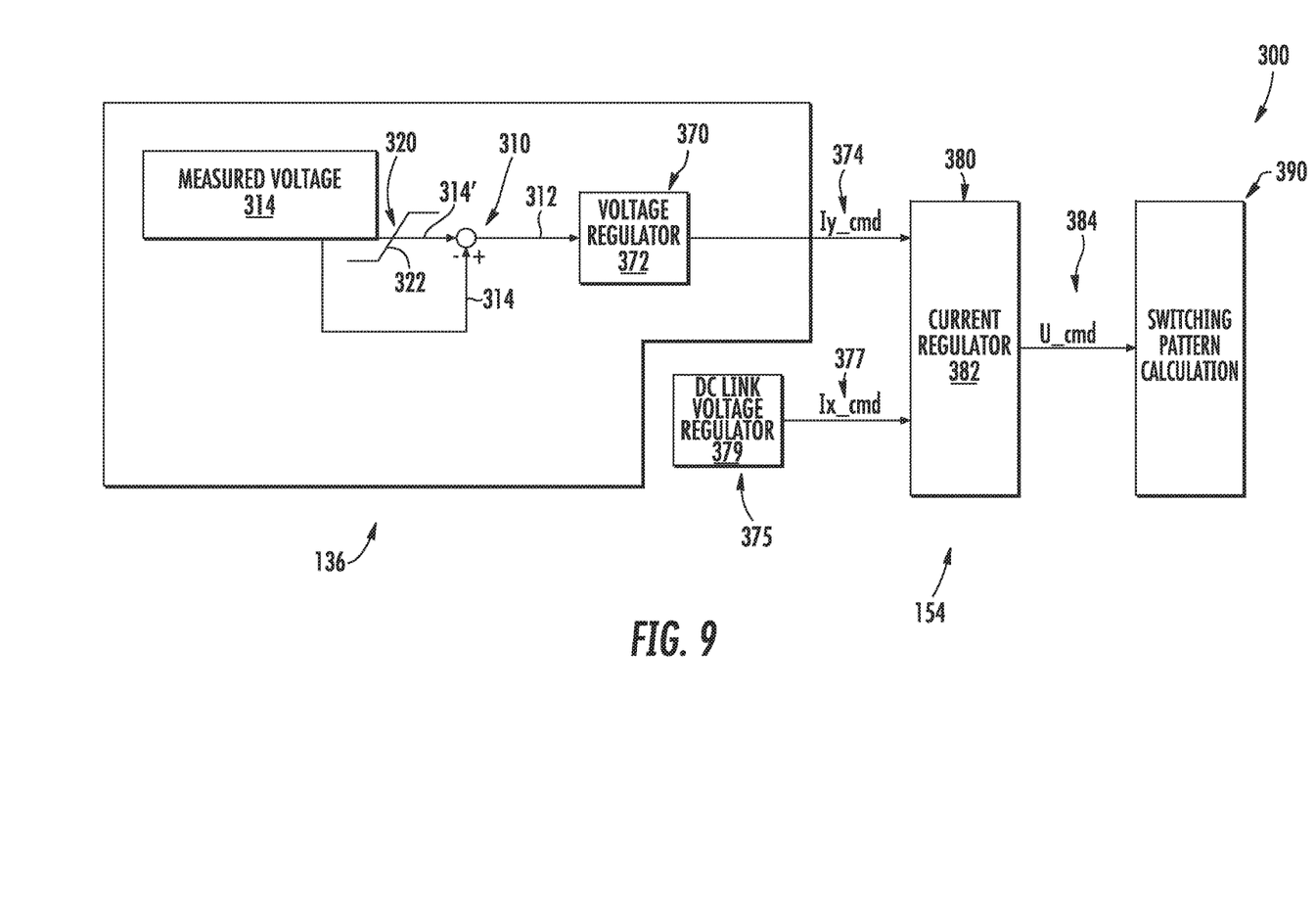
FIG. 9 illustrates a flow diagram of another embodiment of a method for operating an electrical power system according to the present disclosure.
Figure 10:
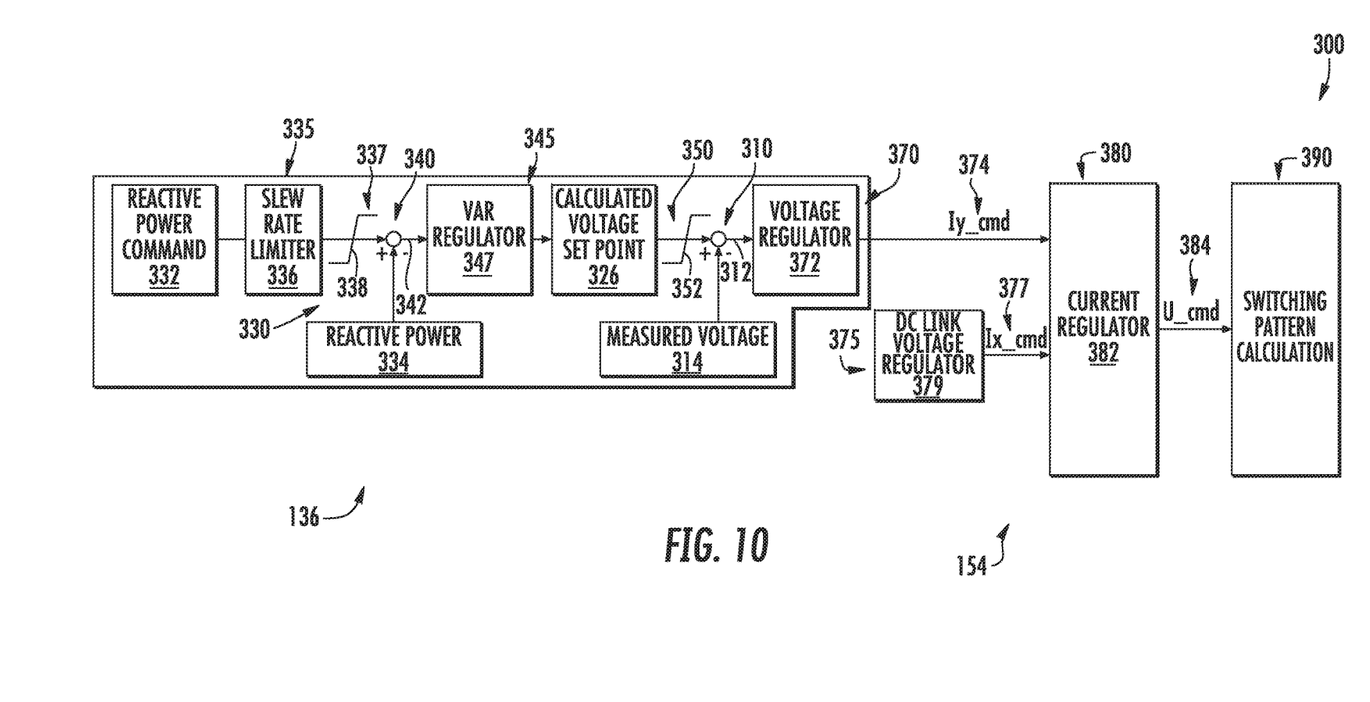
FIG. 10 illustrates a flow diagram of another embodiment of a method for operating an electrical power system according to the present disclosure.

Referring now to FIGS. 8-10, the present disclosure is further directed to methods and control schemes for controlling electrical power subsystems 102. Specifically, such methods and control schemes advantageously provide voltage control of the power converter 122 and line side converter 124 thereof, in order to control the voltage to auxiliary loads via the low voltage distribution panel 220. Additionally, such methods and control schemes advantageously result in the production of reactive power.

It should be noted that such methods as discussed herein may, in exemplary embodiments, be performed by controller 136 and/or 154 as discussed herein. Accordingly, such controller(s) 136, 154 are capable of performing the various operations (i.e. methods steps) as discussed herein.

In general, such methods and control schemes may include determining an auxiliary voltage error value based on a measured voltage of the low voltage distribution panel, such as is discussed herein. Such methods and control schemes may further include receiving an active current command, such as is discussed herein. Such methods and control schemes may further include calculating a switching pattern for a line-side converter of the power converter based on the auxiliary voltage error value and the active current command. A current level produced by the line-side converter may control a voltage to the low voltage distribution panel.

A method 300 may include, for example, the step 310 of determining an auxiliary voltage error value 312. Such value 312 may be based at least in part on a measured voltage 314 of the low voltage distribution panel 220. Such voltage may be measured, for example, by a sensor that is electrically coupled to the panel 220 (such as on path 222) and in communication with controller 136 and/or 154.

For example, in some embodiments, as illustrated in FIG. 8, the auxiliary voltage error value 312 may be determined based on the measured voltage 314 and a predetermined voltage set point 316. Such predetermined voltage set point 316 may be a set point 316 that is predetermined for a particular subsystem 102 by an engineer, developer, etc., for example taking into account the conditions in which the subsystem 102 is being utilized and the desired outputs for the subsystem 102, and programmed into the controller 136 and/or 154. In these embodiments, the measured voltage 314 and predetermined voltage set point 316 may be compared, with a difference between the values being the auxiliary voltage error value 312.

In some embodiments, method 300 may further include the step 315 of adjusting the predetermined voltage set point 316 using a predetermined voltage set point limiter 318. Such limiter 318 may adjust the predetermined voltage set point 316 to within a predetermined limited range, such as between 0.85 per unit ("pu") voltage and 1.15 pu voltage, or such as between 0.9 pu voltage and 1.1 pu voltage.

Notably, in embodiments wherein the predetermined voltage set point 316 is limited, such as via step 315, step 310 may occur after such limiting.

In other embodiments, as illustrated in FIG. 9, method 300 may further include the step 320 of adjusting the measured voltage 314 using a voltage limiter 322. Such limiter 322 may adjust the measured voltage 314 to within a predetermined limited range, such as between 0.85 per unit ("pu") voltage and 1.15 pu voltage, or such as between 0.9 pu voltage and 1.1 pu voltage. In these embodiments, the auxiliary voltage error value 312 may be determined based on the measured voltage 314 (i.e. the actual measured voltage 314 before adjustment by the limiter 322) and the adjusted measured voltage 314' (i.e. after adjustment by the limiter). For example, the actual measured voltage 314 and adjusted measured voltage 314' may be compared, with a difference between the values being the auxiliary voltage error value 312.

In other embodiments, as illustrated in FIG. 10, the auxiliary voltage error value 312 may be determined based on the measured voltage 314 and a calculated voltage set point 326. Rather than being predetermined, as discussed above, the calculated voltage set point 326 may be calculated based on one or more inputs during operation of the system 102, such as a received reactive power command 332. The received reactive power command 332 may be a command received via user input, a farm- or cluster-level controller, or the rotor-side converter 124, and may correspond to a desired reactive power generation by the subsystem 102.

For example, method 300 may further include the step 330 of receiving the reactive power command 332. In some embodiments, method 330 may further include the step 335 of adjusting the reactive power command 332 using a slew rate limiter 336. Such limiter 336 may adjust the slew rate of the reactive power command 332 to within a predetermined limited range. Additionally or alternatively, in some embodiments, method 330 may further include the step 337 of adjusting the reactive power command 332 using a reactive power range limiter 338. Such limiter 336 may adjust the magnitude of the reactive power command 332 to within a predetermined limited range.

Step 330 may further include receiving a converter power path 127 reactive power value 334. Such reactive power value may be measured, for example, by a sensor that is electrically coupled to the converter power path 127 and in communication with controller 136 and/or 154.

In these embodiments, method 300 may further include, for example, the step 340 of determining a reactive power error value 342 based on the reactive power command 332 and the converter power path 127 reactive power value 334. For example, the reactive power command 332 and the converter power path 127 reactive power value 334 may be compared, with a different between the values being the reactive power error value 342. Notably, in embodiments wherein the reactive power command 332 is limited, such as via step 335 or step 337, step 340 may occur after such limiting.

In these embodiments, method 300 may further include, for example, the step 345 of generating, using a volt-ampere reactive ("VAR") regulator 347, the calculated voltage set point 326 based on the reactive power error value 342. VAR regulator may, for example, include a proportional integral (PI) controller, a proportional derivative (PD) controller, a proportional integral derivative (PID) controller, a state space controller, or another other suitable controller. The reactive power error value 342 may be an input to the VAR regulator 347, and the calculated voltage set point 326 may be an output.

As discussed, the auxiliary voltage error value 312 may be determined based on the measured voltage 314 and a calculated voltage set point 326. For example the measured voltage 314 and calculated voltage set point 326 may be compared, with a difference between the values being the auxiliary voltage error value 312.

In some embodiments, method 300 may further include the step 350 of adjusting the calculated voltage set point 326 using a calculated voltage set point limiter 352. Such limiter 352 may adjust the calculated voltage set point 326 to within a predetermined limited range, such as between 0.85 per unit ("pu") voltage and 1.15 pu voltage, or such as between 0.9 pu voltage and 1.1 pu voltage.

Notably, in embodiments wherein the calculated voltage set point 326 is limited, such as via step 350, step 310 may occur after such limiting.

Referring again to FIGS. 8-10, once the auxiliary voltage error value 312 is determined, such value may be utilized to determine a desired current value from power converter 122 which controls the voltage to the low voltage distribution panel 220 to within a desired range. Additionally, such value may be utilized to produce a desired reactive power by the power converter 122.

In some embodiments, as illustrated in FIG. 8, method 300 may include the step 360 of comparing the auxiliary voltage error value 312 to a voltage value deadband range 362. The deadband range 362 may, for example, be between 0.90 per unit ("pu") voltage and 1.1 pu voltage, or such as between 0.95 pu voltage and 1.05 pu voltage. In these embodiments, subsequent steps 370, 375, 380, and/or 390, as discussed herein, may only occur and be performed when the auxiliary voltage error value 312 is outside of the voltage value deadband range 362. In other embodiments, step 360 is not necessary, and subsequent steps 370, 375, 380, and/or 390 may always occur.

Method 300 may further include, for example, the step 370 of generating, using a voltage regulator 372, a reactive current command 374. The reactive current command 374 may be based on the auxiliary voltage error value 312 which is input into the voltage regulator 372. Voltage regulator 372 may, for example, include a proportional integral (PI) controller, a proportional derivative (PD) controller, a proportional integral derivative (PID) controller, a state space controller, or another other suitable controller.

Method 300 may further include the step 375 of receiving an active current command 377. The active current command 377 may, for example, be received from the DC link 128, such as via a sensor that is electrically coupled to the DC link 128 and in communication with the controller 136 and/or controller 154. For example, a voltage level from the DC link 128 may be input to a voltage regulator 379 which may output the active current command 377. Voltage regulator 379 may, for example, include a proportional integral (PI) controller, a proportional derivative (PD) controller, a proportional integral derivative (PID) controller, a state space controller, or another other suitable controller.

Method 300 may further include the step 380 of generating, using a current regulator 382, a voltage input command 384. The voltage input command 384 may be based on the reactive current command 374 and the active current command 377, both of which are input into the current regulator 382. Current regulator 382 may, for example, include a proportional integral (PI) controller, a proportional derivative (PD) controller, a proportional integral derivative (PID) controller, a state space controller, or another other suitable controller.

Method 300 may further include the step 390 of calculating a switching pattern for the line-side converter 126. Such calculation may be based on the voltage input command 384. In exemplary embodiments, such calculation may be performed using and based on pulse-width modulation. The switching pattern that results from step 390 may advantageously produce a current level from the line-side converter 126 that includes a desired reactive power component and that controls the voltage to the low voltage distribution panel 220, as discussed herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling an electrical power subsystem, the electrical power subsystem comprising a power converter electrically coupled to a generator having a generator rotor and a generator stator, the electrical power subsystem defining a stator power path and a converter power path for providing power to the power grid, the converter power path comprising a partial power transformer, the stator power path bypassing the partial power transformer, the electrical power subsystem further comprising a low voltage distribution panel electrically coupled to the converter power path, the method comprising:
   determining an auxiliary voltage error value based on a measured voltage of the low voltage distribution panel;
   receiving an active current command; and
   calculating a switching pattern for a line-side converter of the power converter based on the auxiliary voltage error value and the active current command, wherein a current level produced by the line-side converter controls a voltage to the low voltage distribution panel.

2. The method of claim 1, further comprising:
   generating, using a voltage regulator, a reactive current command based on the auxiliary voltage error value; and
   generating, using a current regulator, a voltage input command based on the reactive current command and the active current command,
   wherein the switching pattern is calculated based on the voltage input command.

3. The method of claim 1, wherein the auxiliary voltage error value is determined based on the measured voltage and a predetermined voltage set point.

4. The method of claim 3, further comprising the step of adjusting the predetermined voltage set point using a predetermined voltage set point limiter.

5. The method of claim 1, further comprising the step of adjusting the measured voltage using a voltage limiter, and wherein the auxiliary voltage error value is determined based on the measured voltage and the adjusted measured voltage.

6. The method of claim 1, wherein the auxiliary voltage error value is determined based on the measured voltage and a calculated voltage set point, the calculated voltage set point based on a received reactive power command.

7. The method of claim 6, further comprising:
   receiving a reactive power command and a converter power path reactive power value;
   determining a reactive power error value based on the reactive power command and the converter power path reactive power value;
   generating, using a VAR regulator, the calculated voltage set point based on the reactive power error value.

8. The method of claim 7, further comprising the step of adjusting the reactive power command using a slew rate limiter.

9. The method of claim 7, further comprising the step of adjusting the reactive power command using a reactive power range limiter.

10. The method of claim 1, further comprising the step of comparing the auxiliary voltage error value to a voltage value deadband range, and wherein calculating the switching pattern occurs only when the auxiliary voltage error value is outside of the voltage value deadband range.

11. An electrical power subsystem for connection to a power grid, the electrical power subsystem comprising:
   a generator comprising a generator stator and a generator rotor;
   a power converter electrically coupled to the generator, the power converter comprising:
      a rotor-side converter;
      a line-side converter; and
      a regulated DC link electrically coupling the rotor-side converter and the line-side converter;
   a stator power path for providing power from the generator stator to the power grid;
   a converter power path for providing power from the generator rotor through the power converter to the power grid;
   a partial power transformer provided on the converter power path, the stator power path bypassing the partial power transformer;
   a low voltage distribution panel electrically coupled to the converter power path; and
   a controller communicative coupled to the power converter, the controller configured to perform one or more operations, the one or more operations comprising:
      determining an auxiliary voltage error value based on a measured voltage of the low voltage distribution panel;
      receiving an active current command; and
      calculating a switching pattern for a line-side converter of the power converter based on the auxiliary voltage error value and the active current command, wherein a current level produced by the line-side converter controls a voltage to the low voltage distribution panel.

12. The electrical power subsystem of claim 11, wherein the one or more operations further comprises:
   generating, using a voltage regulator, a reactive current command based on the auxiliary voltage error value; and
   generating, using a current regulator, a voltage input command based on the reactive current command and the active current command, wherein the switching pattern is calculated based on the voltage input command.

13. The electrical power subsystem of claim 11, wherein the auxiliary voltage error value is determined based on the measured voltage and a predetermined voltage set point.

14. The electrical power subsystem of claim 13, wherein the one or more operations further comprises the step of adjusting the predetermined voltage set point using a predetermined voltage set point limiter.

15. The electrical power subsystem of claim 11, wherein the one or more operations further comprises the step of adjusting the measured voltage using a voltage limiter, and wherein the auxiliary voltage error value is determined based on the measured voltage and the adjusted measured voltage.

16. The electrical power subsystem of claim 11, wherein the auxiliary voltage error value is determined based on the measured voltage and a calculated voltage set point, the calculated voltage set point based on a received reactive power command.

17. The electrical power subsystem of claim 16, wherein the one or more operations further comprises, further comprising:

receiving a reactive power command and a converter power path reactive power value;

determining a reactive power error value based on the reactive power command and the converter power path reactive power value;

generating, using a VAR regulator, the calculated voltage set point based on the reactive power error value.

18. The electrical power subsystem of claim 17, wherein the one or more operations further comprises the step of adjusting the reactive power command using a slew rate limiter.

19. The electrical power subsystem of claim 17, wherein the one or more operations further comprises the step of adjusting the reactive power command using a reactive power range limiter.

20. The electrical power subsystem of claim 11, wherein the one or more operations further comprises the step of comparing the auxiliary voltage error value to a voltage value deadband range, and wherein calculating the switching pattern occurs only when the auxiliary voltage error value is outside of the voltage value deadband range.

* * * * *